US010922592B2

(12) United States Patent
Chuto

(10) Patent No.: US 10,922,592 B2
(45) Date of Patent: Feb. 16, 2021

(54) IMAGE FORMING APPARATUS COMPRISING CONTROLLER CIRCUIT BORAD INSTRUCTS ENGINE CIRCUIT BOARD TO SET A SETTING DATA LIST FOR RENEWING THE SETTING DATA LIST IN HEAD CIRCUIT BOARD TO CONTROL PRINT ENGINE FOR PRINTING PROCESS

(71) Applicant: KYOCERA Document Solutions Inc., Osaka (JP)

(72) Inventor: Tatsuya Chuto, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/687,194

(22) Filed: Nov. 18, 2019

(65) Prior Publication Data
US 2020/0167616 A1 May 28, 2020

(30) Foreign Application Priority Data

Nov. 22, 2018 (JP) .............................. JP2018-219773

(51) Int. Cl.
*G06K 15/02* (2006.01)
*G06K 15/10* (2006.01)
*G06K 15/16* (2006.01)
*G03G 15/045* (2006.01)
*B41J 2/39* (2006.01)
*G06K 15/12* (2006.01)
*B41J 2/32* (2006.01)
(Continued)

(52) U.S. Cl.
CPC ....... *G06K 15/1894* (2013.01); *G06K 15/102* (2013.01); *G06K 15/16* (2013.01); *B41J 2/01* (2013.01); *B41J 2/32* (2013.01); *B41J 2/39* (2013.01); *G03G 15/045* (2013.01); *G06F 3/1255* (2013.01); *G06F 3/1297* (2013.01); *G06K 15/1223* (2013.01)

(58) Field of Classification Search
None
See application file for complete search history.

(56) References Cited

U.S. PATENT DOCUMENTS

2013/0250323 A1\* 9/2013 Wakasa .............. G06K 15/1827
358/1.11

FOREIGN PATENT DOCUMENTS

JP 2008-134558 6/2008

OTHER PUBLICATIONS

Machine Translation in English of JP Pub 2008-134558 published on Jun. 12, 2008 to Shuichi Endo.\*

\* cited by examiner

*Primary Examiner* — Benny Q Tieu
*Assistant Examiner* — Haris Sabah

(57) ABSTRACT

A controller circuit board outputs image data. A head circuit board controls a head unit in accordance with a setting data list. An engine circuit board controls a sheet transportation unit, and sets setting data in the setting data list in accordance with a command from the controller circuit board. The head circuit board receives the image data from the controller circuit board not through the engine circuit board. The controller circuit board outputs a backup command and thereby causes the engine circuit board to acquire the setting data list from the head circuit board, acquires it from the engine circuit board, and store it in a storage device, and outputs a restoration command and a setting data list read from the storage device and thereby causes the engine circuit board to renew the setting data list in the head circuit board.

5 Claims, 5 Drawing Sheets

(51) Int. Cl.
*G06F 3/12* (2006.01)
*B41J 2/01* (2006.01)

| DATA FORMAT VERSION | MACHINE TYPE INFORMATION | SETTING DATA |

IMAGE FORMING APPARATUS COMPRISING CONTROLLER CIRCUIT BORAD INSTRUCTS ENGINE CIRCUIT BOARD TO SET A SETTING DATA LIST FOR RENEWING THE SETTING DATA LIST IN HEAD CIRCUIT BOARD TO CONTROL PRINT ENGINE FOR PRINTING PROCESS

CROSS-REFERENCE TO RELATED APPLICATIONS

This application relates to and claims priority rights from Japanese Patent Application No. 2018-219773, filed on Nov. 22, 2018, the entire disclosures of which are hereby incorporated by reference herein.

BACKGROUND

1. Field of the Present Disclosure

The present disclosure relates to an image forming apparatus.

2. Description of the Related Art

An image forming apparatus includes an image controller that generates print data, a printer engine that forms an image on a recording medium, and an engine controller that controls the printer engine; and stores an initial value of adjustment value data for the engine controller into a non-volatile memory in the image controller for a backup purpose.

However, in a two-circuit-board configuration that includes a controller circuit board that performs data processing and a controller circuit board that controls a print engine, if printing is performed in an inkjet manner with a high linear velocity, the controller circuit board have to be newly designed and manufactured, and therefore a high cost is required for such configuration. Further, when a user or a service person performs adjustment of an inkjet-type print engine for his/her printing purpose, a long time is required for adjustment of setting data and therefore, every time that his/her printing purpose is changed, such long-time adjustment is required.

SUMMARY

An image forming apparatus according to an aspect of the present disclosure includes a head unit configured to eject ink; a controller circuit board configured to output image data that indicates an image to be formed by the head unit; a sheet transportation unit configured to transport a sheet on which the image is formed; an engine circuit board configured to control the sheet transportation unit; and a head circuit board that comprises a processor, the head circuit board controlling the head unit using the processor. Further, the head circuit board receives the image data from the controller circuit board not through the engine circuit board, and controls the head unit in accordance with a setting data list; and the engine circuit board sets setting data in the setting data list in accordance with a command received from the controller circuit board. The controller circuit board (a) includes a non-volatile storage device, (b) outputs a backup command to the engine circuit board and thereby causes the engine circuit board to acquire the setting data list from the head circuit board, acquires the setting data list from the engine circuit board, and stores the acquired setting data list in the storage device, and (c) reads the setting data list from the storage device and outputs a restoration command and the setting data list to the engine circuit board and thereby causes the engine circuit board to renew the setting data list in the head circuit board with the setting data list received from the controller circuit board.

These and other objects, features and advantages of the present disclosure will become more apparent upon reading of the following detailed description along with the accompanied drawings.

BRIEF DESCRIPTION OF THE DRAWINGS

FIG. 3 shows a diagram that explains a data structure of a setting data list 52a shown in FIG. 2;

DETAILED DESCRIPTION

Hereinafter, an embodiment according to an aspect of the present disclosure will be explained with reference to drawings.

Figure 1:
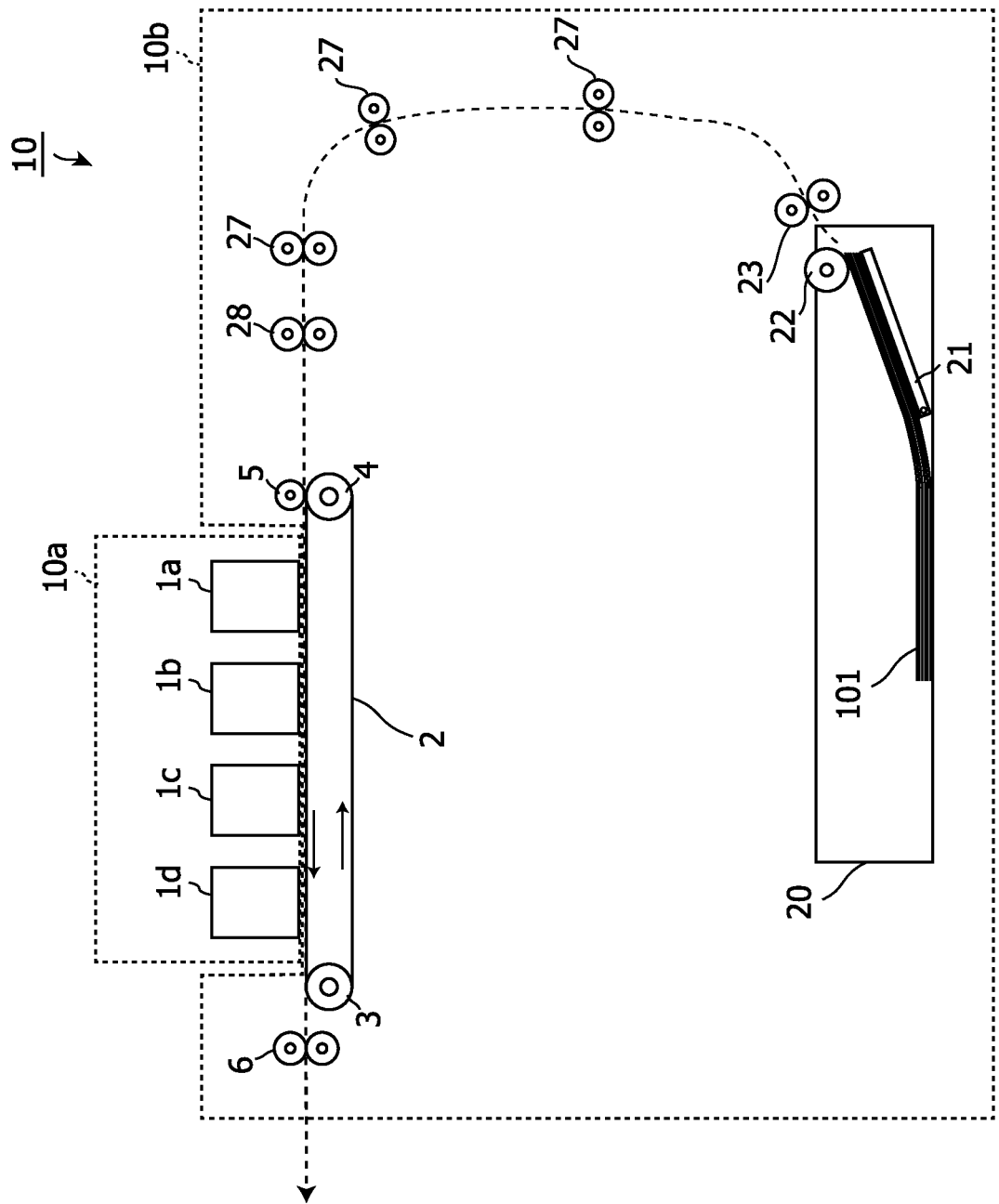
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral, and has an inkjet color printing mechanism of a line type in this embodiment.

The image forming apparatus 10 includes a print engine 10a and a sheet transportation unit 10b. The print engine 10a physically prints an image to be printed on a print sheet (print paper sheet or the like). The sheet transportation unit 10b transports to the print engine 10a the print sheet on which an image is formed.

In this embodiment, the print engine 10a includes line-type head units 1a to 1d corresponding to four ink colors: Cyan, Magenta, Yellow, and Black.

As shown in FIG. 1 in this embodiment, each of the head units 1a to 1d includes plural heads. These heads include nozzles arranged in array in primary and secondary scanning directions, and eject ink from the nozzles.

Further, in this embodiment, the sheet transportation unit 10b includes (a) a circular-type transportation belt 2, arranged so as to face the print engine 10a, that transports a print sheet, (c) a driving roller 3 and a driven roller 4 around which the transportation belt 2 is hitched, (d) a nipping roller 5 that nips the print sheet with the transportation belt 2, and (e) an output roller pair 6.

The driving roller 3 and the driven roller 4 rotate the transportation belt 2. The nipping roller 5 nips an incoming print sheet transported from a sheet feeding cassette 20 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet 101 is outputted by the output roller pair 6 to an output tray (not shown) or the like.

Further, the sheet transportation unit 10b includes a sheet feeding cassette 20. The sheet feeding cassette 20 stores print sheets 101, and pushes up the print sheets 101 using a lift plate 21 so as to cause the print sheets 101 to contact with a pickup roller 22. The print sheets 101 put on the sheet feeding cassette 20 are picked up to a sheet feeding roller 23 by the pickup roller 22 sheet by sheet from the upper side. The sheet feeding roller 23 is a roller that transports the print sheets 101 sheet by sheet fed by the pickup roller 22 from the sheet feeding cassette 20 onto a transportation path.

In the sheet transportation unit 10b, a transportation roller 27 is a transportation roller on the transportation path common to the print sheets 101 transported from the sheet feeding cassette 20. The registration roller 28 temporarily stops the incoming print sheet 101 in transportation, and transports this print sheet 101 to the print engine 10a at a secondary sheet feeding timing. The secondary sheet feeding timing is instructed by an engine circuit board mentioned below or the like such that an image is formed at a specified position on the print sheet 101.

Figure 2:
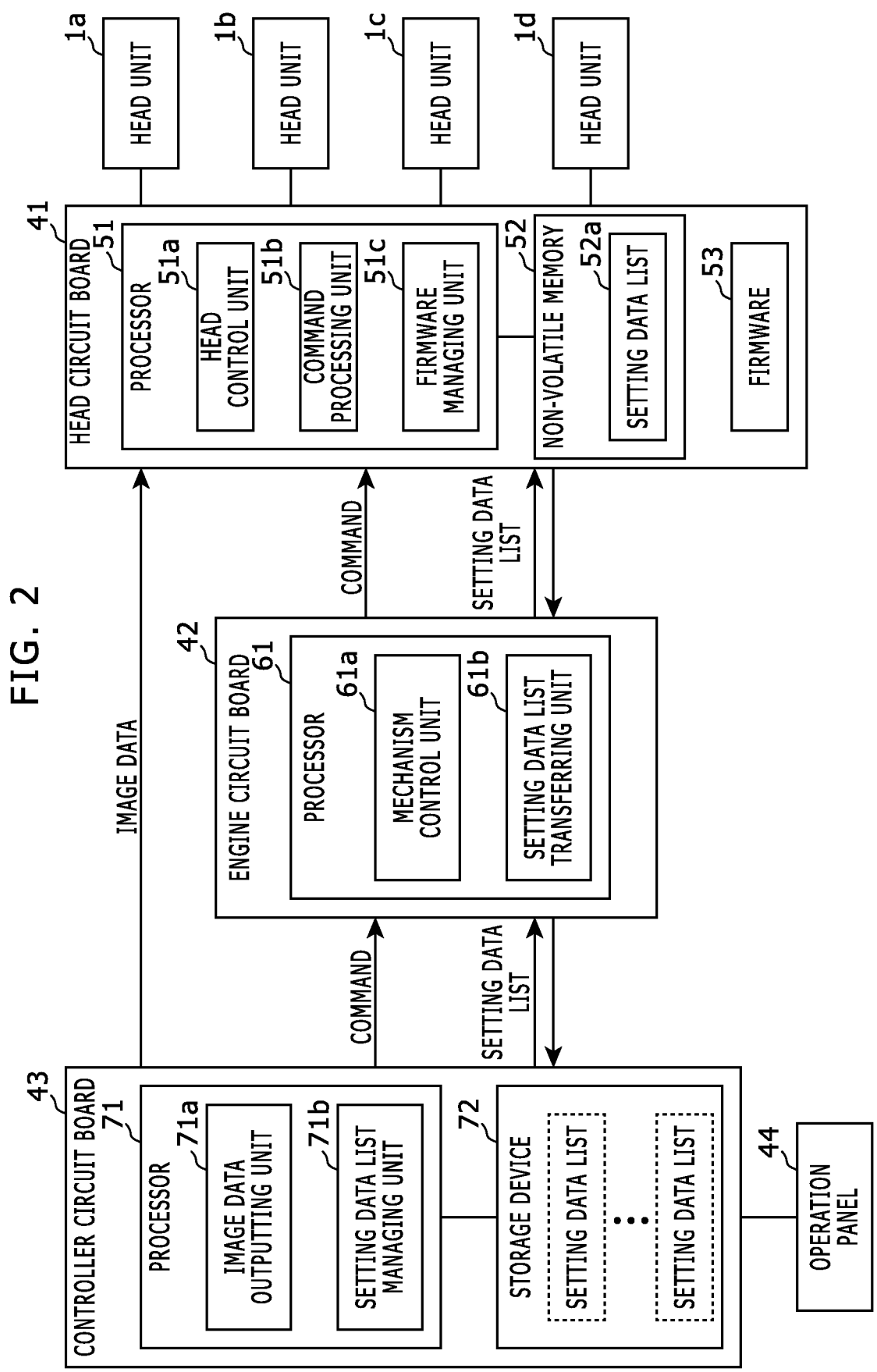
FIG. 2 shows a block diagram that indicates an electronic configuration of the image forming apparatus 10 in the embodiment according to the present disclosure.

FIG. 2 shows a block diagram that indicates an electronic configuration of the image forming apparatus 10 in the embodiment according to the present disclosure. As shown in FIG. 2, the image forming apparatus 10 includes not only the mechanical configuration as shown in FIGS. 1 and 2 but a head circuit board 41, an engine circuit board 42, a controller circuit board 43, and an operation panel 44.

The head circuit board 41 is an electronic circuit board that includes a processor 51, a non-volatile memory 52, and a firmware 53. The head circuit board 41 controls the head units 1a to 1d using the processor 51, and thereby causes the head units 1a to 1d to eject ink corresponding to an image to be printed.

The processor 51 includes a microcomputer that acts in accordance with a program, an ASIC (Application Specific Integrated Circuit) that performs a predetermined action, and/or the like, and acts as sorts of processing units using the computer, the ASIC and/or the like. This microcomputer includes a CPU (Central Processing Unit), a ROM (Read Only Memory), a RAM (Random Access Memory) and the like, and loads a program stored in the ROM or the like or the firmware 53 to the RAM and executes the program using the CPU and thereby acts as processing units (with the ASIC if required).

Here the processor 51 acts as a head control unit 51a, a command processing unit 51b, and a firmware managing unit 51c. The head control unit 51a receives the image data from the controller circuit board 43 not through the engine circuit board 42, and controls the head units 1a to 1d in accordance with a setting data list 52a, and thereby prints on a print sheet an image based on the image data. The command processing unit 51b receives a command from the engine circuit board 42, and performs a process corresponding to the command. The firmware managing unit 51c acquires a firmware from an external device (not shown), and performs a renewal (version-up process or version-down process) of the firmware 53 with the acquired firmware. The firmware 53 is stored in the non-volatile memory 52 or another non-volatile memory.

The non-volatile memory 52 is a rewritable non-volatile memory (EEPROM (Electrically Erasable Programmable Read-Only Memory) or the like). In the non-volatile memory 52, a setting data list 52a has been stored.

FIG. 3 shows a diagram that explains a data structure of the setting data list 52a shown in FIG. 2. The setting data list 52a is a series of data, and includes a data format version, machine type information, and one or plural items of setting data. The setting data list 52a may includes a checksum of itself at its end.

A version of the head circuit board 41 is set to the data format version.

The machine type information indicates a machine type code of this image forming apparatus, a data structure (e.g. a flag that indicates availability of each item of the setting data or the like) of the setting data corresponding to this machine type code, and the like.

The setting data indicates a reference ink ejection amount of the head units 1a to 1d, a disabled nozzle, adjustment values of a print speed corresponding to sizes of a print sheet, and the like.

The setting data list includes setting data that has a data structure according to a data format corresponding to the head circuit board 41. Specifically, the setting data includes an item differently selected on the basis of a type of the head circuit board 41, and therefore the setting data has a data structure corresponding to items required for this head circuit board 41.

It should be noted that a version of the head circuit board 41 may be a unique ID corresponding to a type of the head circuit board 41, a model number of the head circuit board 41, or a version of the firmware.

Further, as mentioned, a version-down process or a version-up process can be performed for the firmware 53. Due to the version-down process or the version-up process, if performed is at least one of processes: (b1) setting disablement of a data area of specific setting data in the setting data list, (b2) adding specific setting data in the setting data list, (b3) changing a data size of specific setting data in the setting data list, and (b4) changing a data name of specific setting data in the setting data list, then the firmware managing unit 51c renews the data format version.

Returning to FIG. 2, the engine circuit board 42 is an electronic circuit board that includes a processor 61. The engine circuit board 42 controls the sheet transportation unit 10b and the like.

The processor 61 includes a microcomputer that acts in accordance with a program, an ASIC that performs a predetermined action, and/or the like, and acts as sorts of processing units using the computer, the ASIC and/or the like. This microcomputer includes a CPU, a ROM, a RAM and the like, and loads a program stored in the ROM or the like to the RAM and executes the program using the CPU and thereby acts as processing units (with the ASIC if required).

Here, the processor 61 acts as a mechanism control unit 61a and a setting data list transferring unit 61b. The mechanism control unit 61a controls a motor or the like (not shown) that drives the sheet transportation unit 10b. When the setting data list 52a is stored for a backup purpose, the setting data list transferring unit 61b transfers the setting data list 52a from the head circuit board 41 to the controller circuit board 43; and when the setting data list 52a is restored, the setting data list transferring unit 61b transfers the setting data list 52a from the controller circuit board 43 to the head circuit board 41.

Further, in accordance with a command received from the controller circuit board 43, the processor 61 in the engine circuit board 42 sets setting data in the setting data list 52a stored in the head circuit board 41. Specifically, the engine circuit board 42 transmits a predetermined command to the head circuit board 41 and thereby sets the setting data.

Further, the controller circuit board 43 is an electronic circuit board that includes a processor 71 and a storage device 72. The controller circuit board 43 outputs image data that indicates an image to be formed by the head units 1a to 1d.

The processor 71 includes a microcomputer that acts in accordance with a program, an ASIC that performs a predetermined action, and/or the like, and acts as sorts of processing units using the computer, the ASIC and/or the like. This microcomputer includes a CPU, a ROM, a RAM and the like, and loads a program stored in the ROM or the like to the RAM and executes the program using the CPU and thereby acts as processing units (with the ASIC if required).

The storage device 72 is a non-volatile storage device such as flash memory, SSD (Solid State Drive) or the like, and is a storage device that has a capacity larger than the non-volatile memory 52.

Here, the processor 71 acts as an image data outputting unit 71a and a setting data list managing unit 71b.

The image data outputting unit 71a transfers image data directly to the head circuit board 41, i.e. not through the engine circuit board 42, after image processing (rasterization, color conversion, halftoning and the like) are performed for the image data.

The setting data list managing unit 71b performs (a) storing the setting data list 52a in the head circuit board 41 for a backup purpose and (b) restoration of the setting data list 52a in the head circuit board 41. Specifically, the setting data list managing unit 71b (a) outputs a backup command to the engine circuit board 42 and thereby causes the engine circuit board 42 to acquire the setting data list 52a from the head circuit board 41, acquires the setting data list from the engine circuit board 42, and stores the acquired setting data list in the storage device 72, and (b) reads the setting data list from the storage device 72 and outputs a restoration command and the setting data list to the engine circuit board 42 and thereby causes the engine circuit board 42 to renew the setting data list 52a in the head circuit board 41 with the setting data list received from the controller circuit board 43.

Further, when setting data adjustment is instructed by a user, the user inputs a value for a specified setting data to the operation panel 44, and the setting data list managing unit 71b renews the corresponding setting data in the setting data list 52a stored in the head circuit board with setting data that has the inputted value. Specifically, the setting data list managing unit 71b outputs a command and the inputted setting data to the engine circuit board 42, and thereby the engine circuit board 42 outputs the command and this setting data to the head circuit board 41 and thereby causes the head circuit board 41 to perform the renewal with this setting data.

When the head circuit board 41 (the command processing unit 51b) renews the setting data list 52a in accordance with the restoration command, the head circuit board 41 (the command processing unit 51b) may determine whether this renewal of the setting data list is allowed or not in accordance with a comparison result between a data format version of the setting data list supplied from the engine circuit board 42 and a version of the current head circuit board 41.

In such a case, for example, (a) if the data format version is newer than the version of the current head circuit board 41 and if there is the disabled data area of the setting data list 52a or there is the added specific setting data of the setting data list 52a, then the head circuit board 41 (the command processing unit 51b) prohibits the renewal of the setting data list 52a; and (b) the data format version is older than the version of the current head circuit board 41 and there is the disabled data area of the setting data list 52a, then the head circuit board 41 (the command processing unit 51b) allows the renewal of the setting data list 52a except for the disabled data area. In the other cases, the renewal of the setting data list 52a is performed.

The operation panel 44 is arranged on a housing surface of the image forming apparatus 10, and includes a display device such as a liquid crystal display and an input device such as a hard key and/or touch panel, and displays sorts of messages for a user using the display device and receives a user operation using the input device.

The following part explains a behavior of the aforementioned image forming apparatus.

(a) Change of the Setting Data List 52a in the Head Circuit Board 41

Figure 4:
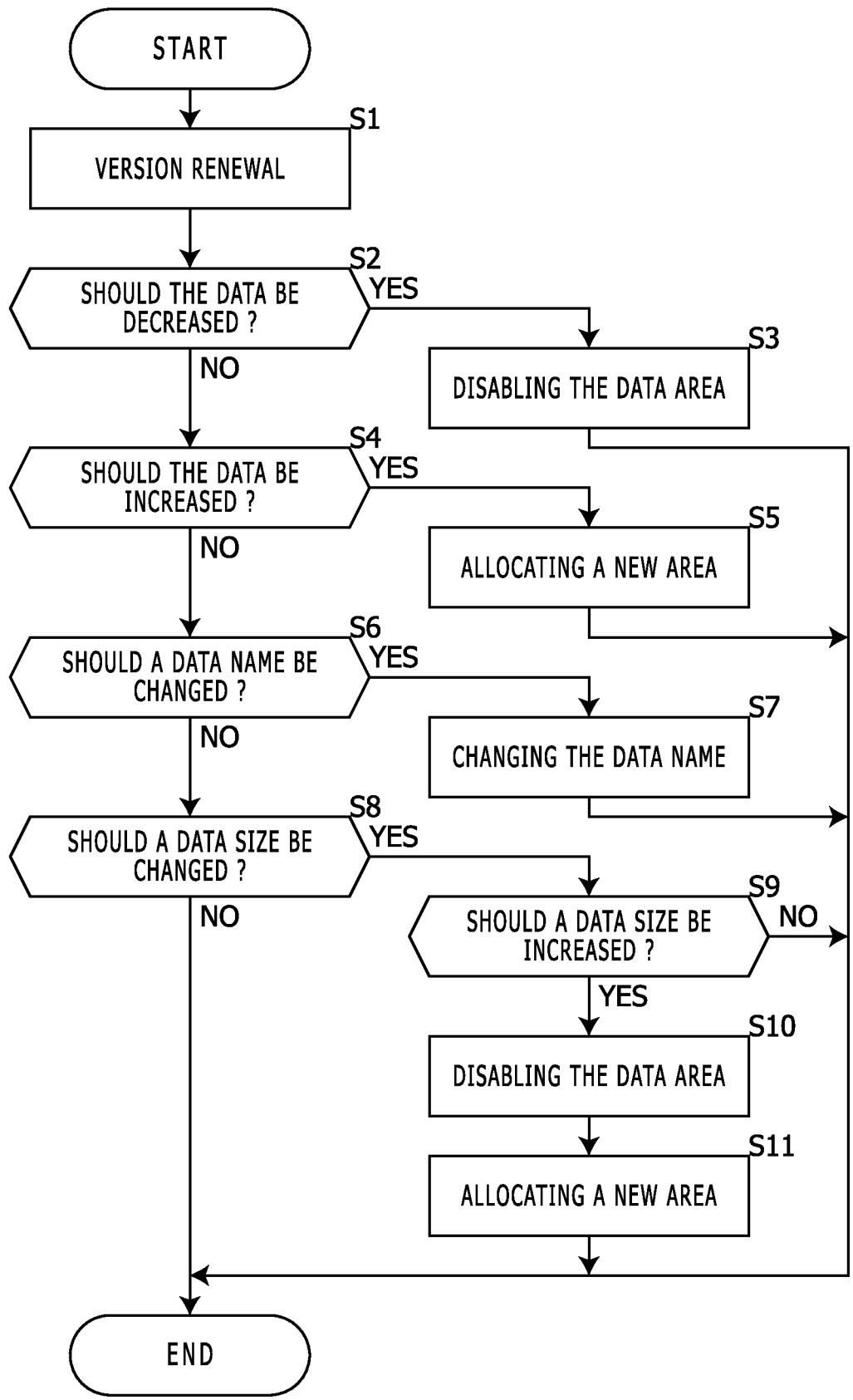
FIG. 4 shows a flowchart that explains change of the setting data list 52a when a firmware 53 is renewed in the image forming apparatus shown in FIGS. 1 and 2.

FIG. 4 shows a flowchart that explains change of the setting data list 52a when a firmware 53 is renewed in the image forming apparatus shown in FIGS. 1 and 2.

In the head circuit board 41, when performing a version-down process or a version-up process of the firmware (in Step S1), the firmware managing unit 51c performs change of the setting data list 52a corresponding to the change of the firmware 53, if required (in Steps S2 to S11).

Here, if setting data should be decreased in the setting data list 52a (in Step S2), the firmware managing unit 51c determines data area that is used for the setting data that will not be used after the version-down process or the version-up process, and sets the determined data area in the non-volatile memory 52 as a disable status (in Step S3).

Otherwise, if setting data should be increased in the setting data list 52a (in Step S4), the firmware managing unit 51c allocates a new data area in the non-volatile memory 52 for setting data added in the version-down process or the version-up process (in Step S5).

Otherwise, if a data name of setting data should be changed in the setting data list 52a due to the version-down process or the version-up process (in Step S6), the firmware managing unit 51c changes a data name of the setting data in the setting data list 52a (in Step S7).

Otherwise, if a data size of setting data should be changed in the setting data list 52a due to the version-down process or the version-up process (in Step S8) and the data size should be increased (in Step S9), then the firmware managing unit 51c (a) sets a current data area of this setting data as a disable status (in Step S10) and (b) allocates a new data area sufficient for the increased data size for this setting data, instead of the disabled data area (in Step S11).

For example, if a unit of a value of setting data is changed, a data size of the setting data may be changed. Specifically, for example, if an ink amount was expressed in picoliter as a unit, but the unit is changed to microliter, then a range of numerals that indicate ink amounts gets narrower and consequently the data size gets smaller.

As mentioned, a data structure of the setting data list 52a may be changed.

(b) Storing the Setting Data List 52a for a Backup Purpose

When the operation panel 44 detects a predetermined user operation, the setting data list managing unit 71b of the processor 71 performs storing the setting data list 52a for a backup purpose.

Specifically, the setting data list managing unit 71b in the controller circuit board 43 outputs a backup command to the engine circuit board 42. The setting data list transferring unit 61*b* in the engine circuit board 42 receives the backup command, and upon receiving the backup command, transmits the backup command to the head circuit board 41.

The command processing unit 51*b* in the head circuit board 41 receives the backup command, and upon receiving the backup command, reads the current setting data list 52*a* and transmits the read setting data list 52*a* to the engine circuit board 42. The setting data list transferring unit 61*b* in the engine circuit board 42 receives the setting data list 52*a* from the head circuit board 41 and transmits the received setting data list 52*a* to the controller circuit board 43.

The setting data list managing unit 71*b* in the controller circuit board 43 receives the setting data list 52*a* from the engine circuit board 42, and stores the received setting data list 52*a* into the storage device 72.

If another setting data list has already been stored in the storage device 72, then the setting data list 52*a* to be currently stored for a backup purpose is stored into the storage device 72 independently from the setting data list that has already been stored in the storage device 72. Thus, the setting data list 52*a* is independently stored such that the setting data list that has already been stored in the storage device 72 is not overwritten with the setting data list 52*a* to be currently stored for a backup purpose. Consequently, a user can save plural setting data lists 52*a* corresponding to his/her various printing purposes in the controller circuit board 43 for a backup purpose without removing them, and afterward, voluntary selects one and restores the setting data list 52*a* in the head circuit board 41 with the selected one.

As mentioned, the setting data list 52*a* in the head circuit board 41 is saved in the controller circuit board 43 for a backup purpose. In association with the setting data list 52*a* saved for a backup purpose, an ID, time and date, a user name, a comment (e.g. printing purpose) and/or the like may be stored as property data.

(c) Restoration of the Setting Data List 52*a*

When the operation panel 44 detects a predetermined user operation, the setting data list managing unit 71*b* of the processor 71 performs restoration of the setting data list 52*a*.

Specifically, at first, the setting data list managing unit 71*b* selects a setting data list to be used for restoration among one or plural setting data lists stored in the storage device 72 for a backup purpose.

In this process, for example, the setting data list managing unit 71*b* displays a list of the one or plural setting data lists stored in the storage device 72 for a backup purpose together with the aforementioned property data, and upon detecting a user's selection operation with the operation panel 44, selects a setting data list specified by the user's selection operation.

Subsequently, the setting data list managing unit 71*b* reads the selected setting data list from the storage device 72, and transmits the read setting data list with a restoration command to the engine circuit board 42. The setting data list transferring unit 61*b* in the engine circuit board 42 receives the setting data list and the restoration command, and upon receiving the setting data list and the restoration command, transmits this setting data list and the restoration command to the head circuit board 41. The command processing unit 51*b* in the head circuit board 41 receives the setting data list and the restoration command, and upon receiving the setting data list and the restoration command, renews the setting data list 52*a* in the non-volatile memory 52 with the received setting data list.

In this process, the command processing unit 51*b* may determine whether the renewal of the setting data list 52*a* in the non-volatile memory 52 is allowed or not; and if it is determined that the renewal of the setting data list 52*a* in the non-volatile memory 52 is allowed, then the command processing unit 51*b* may not perform the renewal of the setting data list 52*a*.

Figure 5:
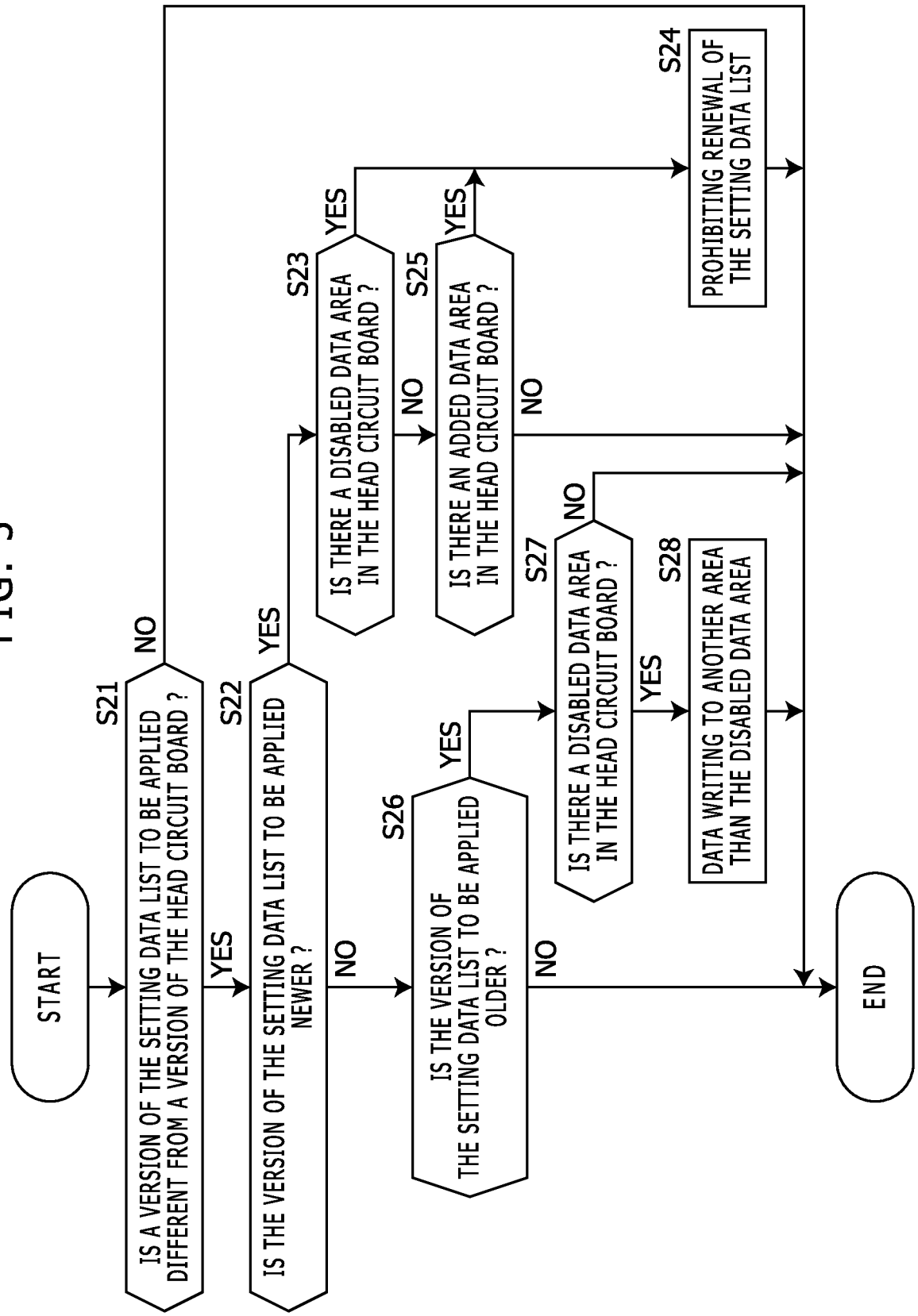
FIG. 5 shows a flowchart that explains a behavior of a head circuit board 41 when the setting data list 52a is restored in the image forming apparatus shown in FIGS. 1 and 2.

FIG. 5 shows a flowchart that explains a behavior of a head circuit board 41 when the setting data list 52*a* is restored in the image forming apparatus shown in FIGS. 1 and 2.

The command processing unit 51*b* determines whether a version (i.e. data format version) of the received setting data list is different from a version of the current head circuit board 41 or not (In Step S21).

If the both are different from each other, the command processing unit 51*b* determines whether the version of the received setting data list is newer than the version of the current head circuit board 41 or not. If the version of the received setting data list is newer than the version of the current head circuit board 41 (in Step S22), then the command processing unit 51*b* determines whether a disable data area (i.e. a corresponding memory area in the non-volatile memory 52) exists in the current setting data list 52*a* or not (in Step S23). If a disable data area exists in the current setting data list 52, then the command processing unit 51*b* prohibits the renewal of the setting data list 52 (in Step S24).

Further, in a case that the version of the received setting data list is newer than the version of the current head circuit board 41 (in Step S22), the command processing unit 51*b* determines whether a data area allocated for an additional data exists in the current setting data list 52*a* or not (in Step S25), and if a data area allocated for an additional data exists in the current setting data list 52*a*, then the command processing unit 51*b* prohibits the renewal of the setting data list 52*a* (in Step S24).

Contrarily, if the version of the received setting data list is older than the version of the current head circuit board 41 (in Step S26), then the command processing unit 51*b* determines whether a disable data area exists in the current setting data list 52*a* or not (in Step S27). If a disable data area exists in the current setting data list 52*a*, then the command processing unit 51*b* overwrites the current setting data list 52*a* with setting data of the received setting data list, except for the disabled data area (in Step S28).

Thus, the renewal of the setting data list 52 may be performed, if required, on the basis of the aforementioned version management.

As mentioned, in the aforementioned embodiment, installed are three circuit boards: the controller circuit board 43 that outputs image data that indicates an image to be formed by the head units 1*a* to 1*d*; the engine circuit board 42 that controls the sheet transportation unit 10*b*; and the head circuit board 41 that includes the processor 51 and controls the head units 1*a* to 1*d* using the processor 51.

The head circuit board 41 receives the image data from the controller circuit board 43 not through the engine circuit board 42, and controls the head units 1*a* to 1*d* in accordance with a setting data list 52*a*; and the engine circuit board 42 sets setting data in the setting data list 52*a* in accordance with a command received from the controller circuit board 43. Further, the controller circuit board 43 (a) includes the non-volatile storage device 72, (b) outputs a backup command to the engine circuit board 42 and thereby causes the engine circuit board 42 to acquire the setting data list 52*a* from the head circuit board 41, acquires the setting data list from the engine circuit board 42, and stores the acquired setting data list in the storage device 72, and (c) reads the setting data list from the storage device 72 and outputs a restoration command and the setting data list to the engine circuit board 42 and thereby causes the engine circuit board 42 to renew the setting data list 52a in the head circuit board 41 with the setting data list received from the controller circuit board 43.

Consequently, printing can be performed in an inkjet manner with a high linear velocity because the image data is supplied directly to the head circuit board 41 installed independently from the engine circuit board 42; and in addition, performing the storing for a backup purpose and the restoration enables adjustment of setting data of the head circuit board 41 in a short time.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, instead of the head circuit board 41, the setting data list managing unit 71b may (a) acquire a version of the head circuit board 41 through the engine circuit board 42 and (b) determine whether the renewal of the setting data list 52a is allowed or not on the basis of the version as mentioned.

What is claimed is:

1. An image forming apparatus, comprising:
   a head unit configured to eject ink;
   a controller circuit board configured to output image data that indicates an image to be formed by the head unit;
   a sheet transportation unit configured to transport a sheet on which the image is formed;
   an engine circuit board configured to control the sheet transportation unit; and
   a head circuit board that comprises a processor, the head circuit board controlling the head unit using the processor;
   wherein the head circuit board receives the image data from the controller circuit board not through the engine circuit board, and controls the head unit in accordance with a setting data list;
   the engine circuit board sets setting data in the setting data list in accordance with a command received from the controller circuit board; and
   the controller circuit board (a) comprises a non-volatile storage device, (b) outputs a backup command to the engine circuit board and thereby causes the engine circuit board to acquire the setting data list from the head circuit board, acquires the setting data list from the engine circuit board, and stores the acquired setting data list in the storage device, and (c) reads the setting data list from the storage device and outputs a restoration command and the setting data list to the engine circuit board and thereby causes the engine circuit board to renew the setting data list in the head circuit board with the setting data list received from the controller circuit board.

2. The image forming apparatus according to claim 1, wherein the setting data list includes a data format version of this setting data list;
   a version of the head circuit board is set to the data format version; and
   the setting data list includes setting data that has a data structure according to a data format corresponding to the head circuit board.

3. The image forming apparatus according to claim 2, wherein the head circuit board (a) performs a version-down process or a version-up process of a firmware; and (b) renews the data format version if due to the version-down process or the version-up process, performed is at least one of processes: (b1) setting disablement of a data area of specific setting data in the setting data list, (b2) adding specific setting data in the setting data list, (b3) changing a data size of specific setting data in the setting data list, and (b4) changing a data name of specific setting data in the setting data list.

4. The image forming apparatus according to claim 2, wherein when the head circuit board renews the setting data list in accordance with the restoration command, the head circuit board determines whether this renewal of the setting data list is allowed or not in accordance with a comparison result between a data format version of the setting data list and a version of the current head circuit board.

5. The image forming apparatus according to claim 3, wherein when the head circuit board renews the setting data list in accordance with the restoration command, the head circuit board determines whether this renewal of the setting data list is allowed or not in accordance with a comparison result between a data format version of the setting data list and a current version of the head circuit board; and
   (a) if the data format version is newer than the version of the head circuit board and if there is the disabled data area or there is the added specific setting data, then the head circuit board prohibits the renewal of the setting data list; and (b) the data format version is older than the version of the head circuit board and there is the disabled data area, then the head circuit board allows the renewal of the setting data list except for the disabled data area.

* * * * *